United States Patent [19]

Ikeda et al.

[11] Patent Number: 5,349,023

[45] Date of Patent: Sep. 20, 1994

[54] VINYL ALCOHOL COPOLYMER HAVING TERMINAL AMINO GROUP

[75] Inventors: Kaoru Ikeda; Toshiaki Sato, both of Kurashiki, Japan

[73] Assignee: Kuraray Co., Ltd., Kurashiki, Japan

[21] Appl. No.: 988,479

[22] Filed: Dec. 10, 1992

[30] Foreign Application Priority Data

Dec. 12, 1991 [JP]  Japan .................................. 3-351953

[51] Int. Cl.$^5$ ................................................ C08F 8/00
[52] U.S. Cl. ...................................... 525/61; 525/60; 525/330.5; 525/330.6; 525/375; 525/378; 525/380; 525/381; 525/382
[58] Field of Search ............ 525/60, 57, 61, 375, 525/378, 381, 382, 330.5, 330.6, 380

[56] References Cited

U.S. PATENT DOCUMENTS

| | | | |
|---|---|---|---|
| 3,095,257 | 6/1963 | Tanabe et al. | 525/60 X |
| 3,652,712 | 3/1972 | Ahmed et al. | |
| 3,684,784 | 8/1972 | Marze | 525/60 |
| 3,864,379 | 2/1975 | Thompson. | |
| 4,070,530 | 1/1978 | Hobbs | 525/60 X |
| 4,311,805 | 1/1982 | Moritani et al. | 525/60 |
| 4,900,795 | 2/1990 | Hoffmann et al. | 525/330.5 X |
| 4,931,501 | 6/1990 | Lai et al. | 525/60 X |
| 5,155,167 | 10/1992 | Piaschmidt, Jr. et al. | 525/60 |
| 5,194,492 | 3/1993 | Pinschmidt, Jr. et al. | 525/60 |

FOREIGN PATENT DOCUMENTS

| | | |
|---|---|---|
| 0092729 | 11/1983 | European Pat. Off. . |
| 0141269 | 5/1985 | European Pat. Off. . |
| 0152180 | 8/1985 | European Pat. Off. . |
| 2329679 | 5/1977 | France . |
| 57-105410 | 6/1982 | Japan . |
| 59-187003 | 10/1984 | Japan . |
| 59-189113 | 10/1984 | Japan . |
| 63-202638 | 8/1988 | Japan . |
| 388837 | 4/1991 | Japan . |
| WO91/15518 | 10/1991 | PCT Int'l Appl. . |
| 0883070 | 11/1981 | U.S.S.R. ............ 525/330.5 |

*Primary Examiner*—Judy M. Reddick
*Attorney, Agent, or Firm*—Oblon, Spivak, McClelland, Maier & Neustadt

[57] ABSTRACT

A vinyl alcohol copolymer having a terminal amino group and comprising 1-90 mol % of vinyl alcohol units and 10-90 mol % vinyl monomers selected from the group consisting of olefins, acrylamides, methacrylamides, vinyl ethers, nitriles, vinyl halides, and vinylidene halides, said copolymer having at least one terminal amino group is useful for preparing resin compositions having good gas barrier properties.

10 Claims, 2 Drawing Sheets

( PPm )

Fig. 4

( PPm )

5,349,023

VINYL ALCOHOL COPOLYMER HAVING TERMINAL AMINO GROUP

BACKGROUND OF THE INVENTION

1. Field of the Invention

The present invention relates to vinyl alcohol copolymers having a terminal amino group and having good reactivity.

The present invention further relates to resin compositions having good mixing dispersibility.

2. Description of the Prior Art

Known vinyl alcohol polymers having a terminal functional group are polyvinyl alcohol having a terminal hydroxyl group via sulfide bond and one having a terminal alkyl group via sulfide group (Japanese Patent Application Laid-open Nos. 105410/1982 and 187003/1984). However, polyvinyl alcohol having a terminal hydroxyl group or terminal alkyl group could not give resin compositions having good mixing dispersibility with thermoplastic resins. Polyvinyl alcohol having a terminal amino group via sulfide bond is also known (WO 91/15518). The polyvinyl alcohol having a terminal amino group, however, could not give, when kneaded with thermoplastic resins, resin compositions having good gas barrier properties. Block copolymer of polyacrylic acid and polyvinyl alcohol linked via sulfide bond is known (Japanese Patent Application Laid-open No. 189113/1984). This block copolymer, however, is poor in mixing dispersibility with thermoplastic resins and hence could not give, when kneaded with thermoplastic resins, resin compositions having good gas barrier properties. Also known is polyvinyl alcohol having side chains of 0.5 to 30 molt of hydrazide group. This polyvinyl alcohol however has low crystallinity, thereby tending to have low water resistance, and could not give, when kneaded with thermoplastic resins, resin compositions having good gas barrier properties.

Vinyl alcohol polymers alone exhibit insufficient flexibility and mechanical properties and, to improve this, blending with other thermoplastic resins such as polyolefins has been practiced. On the other hand, thermoplastic resins alone, such as a polyolefin alone, do not have sufficient gas barrier properties and, to improve, blending with vinyl alcohol polymer has been conducted. However, vinyl alcohol polymer has poor affinity with and dispersibility in thermoplastic resins such as polyolefin, so that shaped articles and films comprising a blend of the above have markedly decreased mechanical properties or transparency.

To solve the above problems, Japanese Patent Application Laid-open No. 202638/1988 discloses a process which comprises blending an ethylene-vinyl alcohol copolymer having a terminal alkyl group and a polyolefin, and Japanese Patent Application Laid-open No. 88837/1991 discloses a process comprising blending an ethylene-vinyl alcohol copolymer and an polyolefin having introduced epoxy group. These processes, however, produce only small improvement effect and it has been desired to further improve dispersibility, transparency and mechanical properties of these blends.

SUMMARY OF THE INVENTION

Accordingly, an object of the present invention is to provide a vinyl alcohol copolymer having any degree of polymerization selected from a range of low degree of polymerization to high degree of polymerization and having a highly reactive amino group introduced into an end thereof. More specifically, the object is to provide a vinyl alcohol copolymer having a terminal amino group, said vinyl alcohol copolymer being capable of giving, when melt kneaded with a thermoplastic resin having functional groups reactive with said amino group, a resin composition having good mixing dispersibility.

Another object of the present invention is to provide a resin composition comprising a vinyl alcohol polymer and a thermoplastic polymer other than vinyl alcohol polymers and being capable of giving films and like shaped articles having good dispersibility and excellent mechanical properties.

As a result of intensive study to solve the above problem, the present inventors have found a vinyl alcohol copolymer having a terminal amino group and comprising 1 to 90 mol % of vinyl alcohol units, 0 to 89 mol % of vinyl ester units and 10 to 90 mol % of units from an ethylenically unsaturated monomer copolymerizable with the vinyl ester and completed the invention (hereinafter this copolymer is referred to as "the first invention").

Also, the present inventors have found a resin composition comprising a vinyl alcohol polymer (A) having a terminal amino group and a thermoplastic resin composition having functional groups reactive with said amino group and completed the invention (hereinafter this resin composition is referred to as "the second invention").

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

The first invention is described at first.

The amino group that constitutes the terminal group of the present invention should be a primary amino group ($-NH_2$) or a secondary amino group (imino group: $=NH$), of which the former is preferred.

Concrete examples of the terminal group having amino group are those represented by the following formula wherein $R^1$ represents a group selected from the following three:
1) a hydrocarbon group which may have amino group or hydroxyl group,
2) a hydrogen atom and
3) an amino group, and $R^2$, $R^3$ and $R^4$ each represents a hydrogen atom or a lower alkyl group, under the condition of either Rhaving an amino group or at least one member of Rand $R^2$ being a hydrogen atom.

Concrete examples of $R^1$ in the formula (I) are lower alkyl groups, e.g. methyl group, ethyl group, propyl group, butyl group, isobutyl group, octyl group, dodecyl group and octadecyl group; lower alkylene groups, e.g. 2-propenyl group and 3-butenyl group; lower alkyl groups having aryl group, e.g. benzyl group and phenylethyl group; lower alkyl groups which may be interrupted by oxygen and having a primary, secondary or tertiary amino group, e.g. 2-aminoethyl group, 4-aminobutyl group, 6-aminohexyl group, 12-amindodecyl group, 2-(2-aminoethylamino) ethyl group, 2-aminoethoxyethyl group, 2-(2-(2-aminoethylamino)-ethylamino)ethyl group and dimethylaminoethyl group; lower alkyl groups having a hydroxyl group, e.g. 2-hydroxyethyl group and 3hydroxypropyl group; primary, secondary or tertiary amino groups, e.g. amino group, methylamino group, dimethylamino group and phenylamino group and hydrogen atom. Where $R^1$ is a hydrocarbon group or one with functional group, the number of the carbon atoms of the hydrocarbon group is preferably not more than 20, more preferably not more than 10.

Examples of $R^2$ are hydrogen atom and lower alkyl groups having not more than 10 carbon atoms, e.g. methyl group, ethyl group, propyl group and butyl group. $R^2$ may be linked with $R^1$ via covalent bond, the concrete examples cyclic alkylene groups having 3 to 8 carbon atoms, e.g. cyclic butylene.

Examples of $R^3$ and $R^4$ are hydrogen atom and lower alkyl groups having not more than 10 carbon atoms, e.g. methyl group, ethyl group, propyl group, butyl group, pentyl group and hexyl group.

Part other than the terminal group of the present invention comprises a monovalent copolymer comprising 1 to 90 mol % of vinyl alcohol units, 0 to 89 mol % of vinyl ester units and 10 to 90 mol % of units from an ethylenically unsaturated monomer (hereinafter this part other than the terminal group is sometimes referred to as "monovalent copolymer").

Examples of vinyl ester units are units from vinyl formate, vinyl acetate, vinyl propionate, vinyl pivalate, vinyl butyrate, vinyl valerate, vinyl caprate, vinyl benzoate and vinyl trifluoroacetate, among which preferred is vinyl acetate from commercial viewpoint.

Examples of units from ethylenically unsaturated monomer (hereinafter referred to as "comonomer") are olefins, e.g. ethylene, propylene, 1-butene and isobutene; acrylamide derivatives, e.g. acrylamide, N-methylacrylamide, N-ethylacrylamide, N,N-dimethylacrylamide, acrylamidepropanesulfonic acid or salts thereof, acrylamidepropyldimethylamine, salts thereof or quaternary salts thereof; methacrylamide derivatives, e.g. methacrylamide, N-methylmethacrylamide, N-ethylmethacrylamide, methacrylamidepropanesulfonic acid or salts thereof, methacrylamidepropyldimethylamine, salts thereof or quaternary salts thereof; vinyl ethers, e.g. methyl vinyl ether, ethyl vinyl ether, n-propyl vinyl ether, i-propyl vinyl ether, t-butyl vinyl ether, dodecyl vinyl ether and stearyl vinyl ether; nitriles, e.g. acrylonitrile and methacrylonitrile; vinyl or vinylidene halides, e.g. vinyl chloride, vinylidene chloride, vinyl fluoride and vinylidene fluoride; allyl compounds, e.g. allyl acetate and allyl chloride; vinylsilyl compounds, e.g. vinyltrimethoxysilane; isopropenyl acetate and N-methylpyrrolidone. Preferred among these comonomer units are olefin units, in particular ethylene units.

The content of vinyl alcohol units in the monovalent copolymer is 1 to 90 mol %, preferably 30 to 80 mol %, more preferably 40 to 75 mol %. The content of vinyl ester units is 0 to 89 mol %, preferably 0 to 50 mol %, more preferably 0 to 30 mol %. That is, the vinyl ester units may not be contained.

The monovalent copolymer is obtained by solvolysis of a copolymer having vinyl ester units. The degree of hydrolysis of the vinyl ester units is preferably 1 to 100 mol %, more preferably 20 to 100 mol %, still more preferably 50 to 100 mol %, yet more preferably 80 to 100 mol %, yet more preferably 95 to 100 mol % and most preferably 99 to 100 mol %. The content of the comonomer units is 10 to 90 mol %, preferably 20 to 70 mol %, more preferably 25 to 60 mol %.

Preferable among the above monovalent copolymers are olefin-vinyl alcohol copolymers, in particular ethylenevinyl alcohol copolymers. Where the monovalent copolymer is an ethylene-vinyl alcohol copolymer, it is desirable that the contents of constituting units other than vinyl alcohol units, vinyl ester units and ethylene units be as small as possible and, concretely, not more than 10 mol %, more preferably not more than 5 mol %.

There are no specific restrictions with respect to the degree of hydrolysis of the vinyl alcohol copolymer having a terminal amino group of the present invention. It is, however, desirable that the copolymer have an intrinsic vismolt, cosity as determined in a 85/15 by weight mixed solvent of phenol/water (hereinafter referred to as "water-containing phenol") at 30° C. (hereinbelow, the intrinsic viscosity means that obtained on vinyl alcohol copolymer having a terminal amino group or vinyl ester copolymer having a terminal amino group) of 0.05 to 10 deciliters/g (hereinafter abbreviated as "dl/g"), more preferably 0.2 to 10 dl/g. If the intrinsic viscosity is less than 0.05 dl/g, the features of vinyl alcohol copolymer will sometimes not be developed. If the intrinsic viscosity exceeds 10 dl/g, efficiency of introduction (blocking efficiency) of a functional group comprising amino group will, depending on reaction conditions, sometimes decrease.

Where the monovalent copolymer is a polymer consisting only of vinyl alcohol units (including units from unhydrolyzed vinyl ester) and units from an olefin, it is desirable that the copolymer have an intrinsic viscosity of 0.5 to 3 dl/g, more preferably 0.7 to 2 dl/g.

The amino group introduced into the end of the monovalent copolymer of the present invention is preferably introduced into only the end (preferably one end). Where the amino group is also introduced into the side chains other than the end, the resulting copolymer has reduced crystallinity and tends to decrease its water resistance. The content of the amino group in the side chains of the monovalent copolymer is therefore preferably not more than 0.5 mol %, more preferably not more than 0.3 mol %, most preferably not more than 0.1 mol %.

The process for producing the vinyl alcohol copolymer having a terminal amino group of the present invention is now described.

As a result of an intensive study on processes for producing the vinyl alcohol copolymer having a terminal amino group of the present invention, the present inventors have found 2 processes.

The first process comprises reacting a copolymer comprising vinyl alcohol units and having a terminal ester bond with a primary or secondary amine or ammonia. This process is suitable for producing vinyl alcohol copolymers having a terminal amino group and having a degree of hydrolysis of at least 50 mol %. The copolymer comprising vinyl alcohol units and having a terminal ester bond is obtained by the successive steps of copolymerizing a vinyl ester and a comonomer to obtain a copolymer comprising vinyl ester units, solvolyzing the obtained copolymer and treating the solvolyzed product with an acid. Vinyl esters having no hydrogen atom on the a α-position of the carbonyl group in the ester bond are polymerized in a solvent represented by the following formula (II)

(II)

wherein $R^3$, $R^4$ and $R^5$ are each as defined for the same, respectively, in the formula (I).

A vinyl ester represented by the following formula (III) is polymerized in a solvent or without solvent, and preferably without solvent or in a solvent represented by the above formula (II)

(III)

wherein $R^3$ and $R^4$ are as defined for the same in formula (I).

Examples of the vinyl ester represented by the above formula (III) are vinyl acetate, vinyl propionate, vinyl butyrate and vinyl isobutyrate.

The vinyl ester units and comonomer units mentioned in the description of the monovalent copolymer also exemplify those constituting the copolymer having vinyl ester units. Where units from a monomer having carboxylic group or functional group convertible to carboxylic group or having ester bond such as lactone ring are present in the main chain other than the end of the copolymer having vinyl ester units, their content in the copolymer having vinyl ester units is smaller the better, since they may possibly cause amino groups to be introduced into the side chains of the monovalent copolymer. Thus, the content of units from such a monomer is preferably less than 0.5 mol %, more preferably less than 0.3 mol % and most preferably less than 0.1 mol %.

There are no specific restrictions with respect to the conditions of solvolysis of the copolymer having vinyl ester units, but solvolysis with an alkaline catalyst, in particular methanolysis with a catalyst of NaOH, KOH, $CH_2ONa$ or $CH_3OK$ is desirable. The amount of the alkaline catalyst used for the solvolysis is preferably in an amount of 0.02 to 200 moles based on 100 moles of the vinyl ester units in the copolymer. The solvolysis temperature is preferably in a range of from room temperature to 120° C. The obtained copolymer having vinyl alcohol units may have any degree of hydrolysis of vinyl ester units, but higher degree of hydrolysis is desirable for the purpose of suppressing consumption of the primary or secondary amine or ammonia due to reaction with the vinyl ester units that have not been hydrolyzed. Thus, the copolymer having vinyl alcohol units preferably has a degree of hydrolysis of at least 50 mol %, more preferably at least 95 mol %, most preferably at least 99 mol %.

The copolymer having vinyl alcohol units can be acid-treated under any conditions, but it is desirable to conduct the treatment in a reaction solvent of an alcohol such as methanol, ethanol or ethylene glycol, in the presence of a catalyst such as sulfuric acid, hydrochloric acid, p-toluenesulfonic acid or acetic acid and at a temperature in a range of from room temperature to 150° C.

The obtained copolymer having vinyl alcohol units and a terminal ester bond is reacted with a primary or secondary amine or ammonia, among which preferred is a compound represented by the following formula (IV)

(IV)

wherein $R^1$ and $R^2$ are each as defined for the same in formula (I).

Examples of the primary or secondary amine represented by the above formula (IV) are, alkylamines, e.g. methylamine, dimethylamine, ethylamine, propylamine, butylamine, octylamine and stearylamine; unsaturated amines, e.g. allylamine and diallylamine; diamines, e.g. ethylenediamine, hexamethylenediamine and dodecamethylenediamine; polyamines, e.g. diethylenetriamine, 3,3'-diaminodipropylamine, triethylenetetramine, tetraethylenepentamine and pentaethylenehexamine; aminoalcohols, e.g. ethanolamine and 4-aminobutanol; cyclic amines, e.g. pyrrolidine, piperidine and morpholine and hydrazines, e.g. hydrazine, methylhydrazine, N,N-dimethylhydrazine and phenylhydrazine. Particularly preferred among these amines are primary amines in view of reactivity with the copolymer having vinyl alcohol units and a terminal ester bond.

The conditions of reaction of the copolymer having vinyl alcohol units and a terminal ester bond with a primary or secondary amine or ammonia are suitably selected depending on the reactivity of the reactant. The amount of the primary or secondary amine or ammonia to be fed is selected from a range of from 2 times to large excess of the amount to be introduced into the copolymer having vinyl alcohol units. Usable solvents are alcohols, e.g. methanol and ethylene glycol; dimethylacetamide; N-methylpyrrolidone; dimethyl sulfoxide and the like. The reaction temperature is appropriately selected from a range of from room temperature to 200° C. Use of a catalyst, such as an alkaline catalyst, e.g. NaOH, KOH, $CH_2ONa$ and $CH_3$ OK, or acid catalyst, e.g. acetic acid, hydrochloric acid and sulfuric acid can increase the reaction rate to a certain degree.

The second production process comprises reacting a copolymer obtained by copolymerizing a vinyl ester and an ethylenically unsaturated monomer and having a degree of hydrolysis of 0 mol %, with a primary or secondary amine or ammonia, to produce the copolymer having vinyl alcohol units and a terminal amino group. This process is suitable for producing vinyl alcohol-based copolymers having a terminal amino group and having a degree of hydrolysis of 1 to 100 mol %, in particular for producing vinyl alcohol-based copolymers having a terminal amino group and having a degree of hydrolysis of 1 to 50 mol %.

The vinyl esters and ethylenically unsaturated monomers (comonomers) mentioned in the description of the first production process are also usable here.

The copolymer obtained by copolymerizing a vinyl ester and an ethylenically unsaturated monomer and having a degree of hydrolysis of 0 mol %, which has a terminal carboxyl group, reacts with a primary or secondary amine or ammonia, whereby the corresponding amino group is introduced into the end of the copolymer and, at the same time, the vinyl ester units in the main chain of the copolymer are hydrolyzed, to yield a vinyl alcohol copolymer having a terminal amino group.

The feed ratio of the primary or secondary amine or ammonia to the copolymer having vinyl ester units with a degree of hydrolysis of 0 mol % is preferably 0.2 to 100 mol % based on the vinyl ester monomer units of the copolymer, more preferably 1 to 10 mol % on the same basis.

Desirable solvents are those having high polarity, e.g. alcohols such as methanol, ethanol and propanol; dimethyl sulfoxide and N-methylolpryrrolidone, among which methanol is particularly preferred.

The reaction temperature is preferably in a range of from room temperature to 100° C. and the reaction time is preferably 10 minutes to 5 hours.

Where there is desired still higher degree of hydrolysis of the vinyl alcohol copolymer having a terminal amino group, it is achieved by further hydrolyzing by the usual process using alkaline catalyst or the like.

Of the first and second processes, the first one is more preferable for producing vinyl alcohol copolymers having a terminal amino group and a degree of hydrolysis of 50 to 100 mol %.

The vinyl alcohol copolymers having a terminal amino group of the present invention are usable as starting materials for producing graft polymers and block polymers and like purposes. The graft polymers and block polymers from this copolymer, which have good chemical stability against alkylation agents, oxidizing agents and the like, have high utility in many fields, such as paints, adhesives and compatibility-improving agents.

According to the present invention, there are provided vinyl alcohol copolymers having any degree of polymerization ranging from low degree of polymerization to high degree of polymerization and having a terminal amino group. The vinyl alcohol copolymers having highly reactive amino group introduced into the end thereof, give, when melt kneaded with thermoplastic resins having functional groups reactive with the amino group, resin compositions having good mixing dispersibility and gas barrier properties.

The second invention is described next.

The vinyl alcohol polymer (A) having a terminal amino group used in the invention is a polymer having vinyl alcohol units in the main chain and having a terminal amino group. Among vinyl alcohol polymers having terminal amino group, those having a primary or secondary amino group substantially at the ends (preferably at one end) thereof. The vinyl alcohol polymers preferably have as small side chain amino groups as possible, since side chain amino groups cause, by crosslinking, viscosity increase, gel formation or like troubles. The content of side chain amino groups is therefore preferably less than 0.5 mol %, more preferably less than 0.3 mol %, most preferably less than 0.1 mol %. The primary or secondary amino group means a primary amino group or an alkyl-substituted secondary amino group and its examples include amino group, methylamino group, ethylamino group and butylamino group, as well as hydrazides, such as hydrazide group and N-methylhydrazide group, which have active amino groups in their structure.

There are no specific restrictions with respect to the content of vinyl alcohol units in the vinyl alcohol polymer, but it is preferably 1 to 90 mol %, more preferably 30 to 80 mol % and most preferably 40 to 75 mol %. Particularly preferred among the vinyl alcohol polymers are ethylenevinyl alcohol copolymers, in which the ethylene content is preferably 10 to 90 mol %, more preferably 20 to 70 mol % and most preferably 25 to 60 mol %.

Unhydrolyzed vinyl ester units in the vinyl alcohol polymer decreases the crystallinity of the polymer, and hence the degree of hydrolysis of the polymer is the higher the better. Thus, the degree of hydrolysis of the vinyl alcohol polymer is preferably 1 to 100 mol %, more preferably 20 to 100 mol %, still more preferably 50 to 100 mol %, yet more preferably 80 to 100 mol %, yet more preferably 95 to 100 mol % and most preferably 99 to 100 mol %.

Where the vinyl alcohol polymer is a copolymer, examples of the units other than vinyl alcohol units are vinyl ester units and comonomer units. Concrete examples of the vinyl ester units and comonomer units are the same as those mentioned in the description for the monovalent copolymer of the first invention.

The vinyl alcohol polymer having a terminal amino group may have any melt index (measured at 190° C. under a load of 2160 g), but it is preferably 0.1 to 100 g/10 min. Where the vinyl alcohol polymer has a melt index of less than 0.1 g/1O min and is not thermoplastic, it is desirable to adjust the MI up to an appropriate level by adding to the polymer a polyhydric alcohol plasticizer such as glycerine, diglycerine, triglycerine, ethylene glycol, triethylene glycol, polyethylene glycol or polypropylene glycol or mixtures of the foregoing.

Among the vinyl alcohol polymers having a terminal amino group of the present invention, preferred are those which are by themselves thermoplastic without addition of any plasticizer and in particular the vinyl alcohol copolymers having a terminal amino group mentioned in the description of the first invention.

The thermoplastic polymer (B) having functional groups reactive with amino group used in the present invention includes thermoplastic polymers having functional groups reactive with amino group, e.g. an epoxy group and acid anhydrides such as anhydrous ring and oxazoline ring. The thermoplastic polymer having functional groups reactive with amino group is obtained by copolymerizing a monomer having such functional group with an olefin monomer or vinyl monomer. Also available is a process which comprises grafting a monomer having the functional group to an olefin polymer or vinyl polymer using an initiator such as peroxide, heat, light, radioactive rays or the like. Examples of the monomer constituting the olefin or vinyl polymer are olefins, e.g. ethylene, propylene, 1-butene, 3-methyl-1-butene, 1-hexene and 1-octene; vinyl esters, e.g. vinyl acetate, vinyl propionate and vinyl pivalate; acrylic acid esters, e.g. methyl acrylate, ethyl acrylate, butyl acrylate, hexyl acrylate, octyl acrylate, dodecyl acrylate and 2-ethylhexyl acrylate; methacrylic acid esters, e.g. methyl methacrylate, ethyl methacrylate, butyl methacrylate, hexyl methacrylate, octyl methacrylate and dodecyl methacrylate; vinyl halides, e.g. vinyl chloride and vinyl fluoride and styrene derivatives, e.g. styrene and α-methylstyrene. Examples of the monomer having a functional group reactive with amino group are monomers having epoxy group, such as glycidyl methacrylate, glycidyl acrylate, allyl glycidyl ether and vinyl glycidyl ether; monomers of acid anhydrides, such as maleic anhydride and itaconic anhydride and monomers having oxazoline ring, such as 2-vinyloxazoline and 2-(4-vinylamino phenyl)oxazoline. The suitable amounts of these monomers to be fed vary depending on the reactivity of their functional groups. ,With the functional group being contained in too large an amount, gels tend to form, while too small a content produces little effect. The functional group equivalent is, although not specifically limited, preferably 500 to 200,000, and 500 to 20,000 for epoxy group, 10,000 to 200,000 for acid anhydride and 500 to 10,000 for oxazoline ring. The functional group equivalent means the amount in grams of resin containing 1 g-equivalent of the functional group.

The thermoplastic polymer having functional group reactive with amino group may have any MI, but it is preferably 0.1 to 100 g/10 min, more preferably 0.5 to 500 g/10 min and most preferably 0.5 to 100 g/10 min.

The resin composition of the present invention comprises a vinyl alcohol polymer (A) having a terminal amino group and a thermoplastic polymer (B) having functional group reactive with the amino group. The incorporation ratio between component (A) and component (B) is in a range of 99:1 to 1:99, preferably in a range of 95:5 to 5:95, more preferably in a range of 95:5 to 30:70 and most preferably 95:5 to 45:55.

The resin composition of the present invention, which comprises component (A) and component (B), may further contain a thermoplastic vinyl alcohol polymer (C) having no a terminal amino group and/or a thermoplastic resin (D) having no functional group reactive with amino group. Let, for instance, component (A) be an ethylene-vinyl alcohol copolymer having a terminal amino group, component (B) an ethylene-glycidyl methacrylate copolymer, component (C) an ethylene-vinyl alcohol copolymer and component (D) polyethylene. Then, to improve the gas barrier properties, resistance to solvents and warmth-keeping property polyethylene film, the composition is selected from a range of [(A)+(C)]:[(B)+(D)] of 5:95 to 45:5. Or, to provide ethylene-vinyl alcohol copolymer with flexibility and shock resistance, the composition is selected from a range of [(A) +(C)]:[(B)+(D)] of 55:45 to 95:5. In this case, it is more effective to blend component (A) with component (B) at first and then blending the obtained blend with component (C) and component (D). This prevents, even when the total content of component (A) and component (B) is only about 5% by weight or so, deterioration of properties due to poor dispersibility. The blending can be carried out by any known process such as one with Banbary mixer or melt blending with a single-screw or twin-screw extruder. Upon blending, there may be incorporated, within limits not to impair the function and effect of the present invention, other additives such as antioxidant, ultraviolet absorber, lubricant, plasticizer, antistatic agent and color.

The resin composition of the present invention can readily be molded by known melt molding processes and be formed into optional shaped articles such as films, sheets, tubes or bottles. The resin composition further is usable, in combination with other thermoplastic resins, e.g. polyethylene, polypropylene, polyethylene terephthalate, polyamides and polystyrene, as a layer for multilayered laminates, which are formed by multi-layer co-extrusion, co-injection, extrusion coating or like known processes and used as various packaging materials.

The resin composition of the present invention, comprising a vinyl alcohol polymer (A) having a terminal amino group and a thermoplastic resin (B) having functional group reactive with the amino group, gives films, sheets, containers and the like, which have far better mechanical properties, transparency and gas barrier properties than conventional compositions comprising a vinyl alcohol polymer and a thermoplastic resin and are hence suitably used in the fields of various packaging materials, molding materials and the like.

Other features of the invention will become apparent in the course of the following descriptions of exemplary embodiments which are given for illustration of the invention and are not intended to be limiting thereof. In the Examples and Comparative Examples that follow, "%" means "% by weight" unless otherwise specified.

EXAMPLES

Synthesis Example 1

Synthesis of ethylene-vinyl acetate copolymer

An autoclave equipped with a stirrer, the air inside which had been sufficiently replaced by nitrogen, was charged with 905 g of vinyl acetate, 1,207 g of methyl acetate and 1.256 g of 2,2'-azobisisobutyronitrile. The atmosphere in the vessel was then replaced by ethylene and ethylene was further introduced to make the internal pressure 14 kg/cm$^2$. The autoclave was then heated to a temperature of 60° C., which caused to internal pressure to become 29.5 kg/cm$^2$. Five hours after the start of reaction, the autoclave was cooled to room temperature, to terminate reaction. The reaction mixture was reprecipitated from hexane and the obtained solid was dried with hot air at 40° C. for 12 hours and then by vacuum drying at 100° C. for 12 hours, to give an ethylene-vinyl acetate copolymer having an ethylene content of 43 mol %. The yield was 33.7%.

Synthesis Example 2

Synthesis of ethylene-vinyl alcohol copolymer

A separable flask equipped with a stirrer and a distillation column was charged with 338 g of the ethylene-vinyl acetate copolymer obtained in Synthesis Example 1 and 800 g of methanol. The separable flask was heated to a temperature of 65° C. and 30 g of sodium hydroxide was added to conduct solvolysis of the ethylene-vinyl acetate copolymer, while the byproduct methyl acetate and methanol were being distilled off. One hour after the start of reaction, 30 g of sodium hydroxide was added again to permit the reaction to proceed for further 2 hours. The reaction mixture obtained was neutralized by addition of 150 g of acetic acid and the resulting mixture was reprecipitated from distilled water. The copolymer thus obtained was further washed sufficiently with distilled water and dried with hot air at 100° C. for 5 hours and then by vacuum drying at 100° C. for 12 hours, to give an ethylene-vinyl alcohol copolymer having an ethylene content of 43 mol % and a degree of hydrolysis of 99.5 mol %.

Synthesis Example 3

Synthesis of an ethylene-vinyl alcohol copolymer having ester bond at one end thereof An autoclave equipped with a stirrer was charged with 120 g of the ethylene-vinyl alcohol copolymer obtained in Synthesis Example 2, 500 g of methanol and 0.5 g of sulfuric acid, and reaction was effected at 90° C. for 2 hours. After completion of the reaction, the autoclave was cooled to 60° C. and the 50 milliliters (hereinafter abbreviated as "ml") of a 10 % sodium acetate solution in methanol was added to the reaction mixture to neutralize it. The reaction mixture thus neutralized was reprecipitated from distilled water, to obtain a copolymer. The copolymer was washed well with distilled water and dried with hot air at 100° C. for 5 hours and then vacuum-dried at 100° C. for 12 hours, to obtain an ethylene-vinyl alcohol copolymer having an ester bond at one end thereof and having an intrinsic viscosity as determined in water-containing phenol at 30° C. of 0.507 dl/g, an ethylene content of 43 mol % and a degree of hydrolysis of 99.8 mol %.

Example 1

Synthesis of an ethylene-vinyl alcohol copolymer having hydrazide group at one end thereof A reaction vessel equipped with a stirrer was charged with 50 g of the ethylene-vinyl alcohol copolymer having an ester bond at one end thereof and obtained in Synthesis Example 3, 100 g of methanol, 20 g (0.4 mole) of hydrated hydrazine and 5 ml of a 2N sodium hydroxide solution in methanol, and reaction was effected at 65° C. for 3 hours. After completion of the reaction, the vessel was cooled to room temperature and the reaction mixture was reprecipitated from distilled water. The copolymer gel obtained was washed well with distilled water, dried with hot air at 100° C. for 5 hours and vacuum-dried at 100° C. for 12 hours, to give an ethylene-vinyl alcohol copolymer having hydrazide group at one end thereof and having an intrinsic viscosity of 0.507 dl/g, an MI of 850 g/10 min, an ethylene content of 43 mol % and a degree of hydrolysis of 99.9 mol %. The hydrazide group at one end of the copolymer was trinitrophenyl-ized with trinitrobenzenesulfonic acid and the obtained product was subjected to quantitative determination for the amino group by spectrochemical analysis in ultraviolet and visible region. The amino group was found to be $6.1 \times 10^{-5}$ equivalent/g. From this results on determination of amino group and from consideration of the reaction mechanism, the product was identified to be an ethylene-vinyl alcohol copolymer having a hydrazide group at one end thereof.

Example 2

Synthesis of an ethylene-vinyl alcohol copolymer having N-(2-aminoethyl)amide at one end thereof An autoclave equipped with a stirrer was charged with 100 g of an ethylene-vinyl alcohol copolymer having an ethylene content of 32 mol % and a degree of hydrolysis of 99.5 mol %, 400 g of methanol and 0.5 g of sulfuric acid, and reaction was effected at 60° C. for 2 hours. To the reaction mixture, 60 g of ethylenediamine was added and reaction was further effected at 120° C. for 4 hours. After completion of the reaction, the autoclave was cooled to room temperature and the obtained polymer gel was washed well with distilled water and pulverized. The powder thus obtained was washed again with distilled water, dried with hot air at 60° C. for 10 hours and vacuum-dried at 100° C. for 12 hours, to give an ethylene-vinyl alcohol copolymer having N-(2-aminoethyl)amide at one end thereof and having an intrinsic viscosity as determined in water-containing phenol at 30° C. of 1.07 dl/g, an MI of 1.6 g/10 min, an ethylene content of 32 mol % and a degree of hydrolysis of 99.8 mol %. The amino group at one end of the copolymer was determined in the same manner as in Example 1, to show $3.2 \times 10^{-5}$ equivalent/g. From this results on determination of amino group and from consideration of the reaction mechanism, the product was identified to be an ethylene-vinyl alcohol copolymer having an N-(2-aminoethyl)amide group at one end thereof.

Example 3

Figure 1:
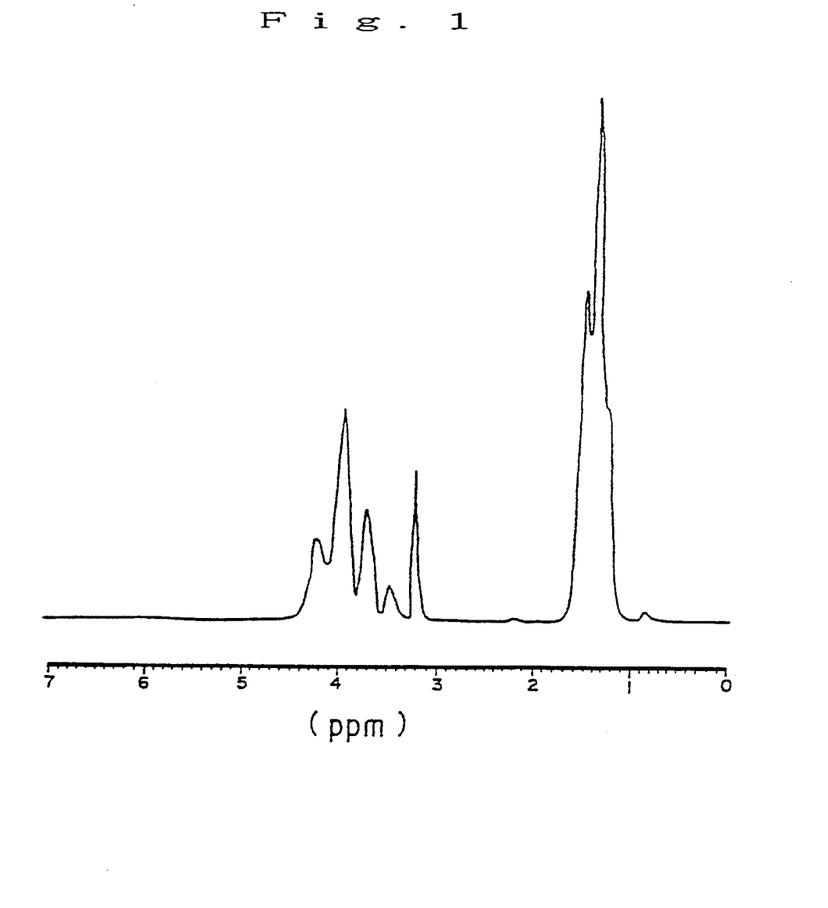
FIG. 1 shows the 270 MHz NMR spectrum of the ethylene-vinyl alcohol copolymer having at one end thereof N-butylamide obtained in Example 3, measured in 4: 1 mixed deuterated methanol/heavy water at 80° C.
Figure 2:
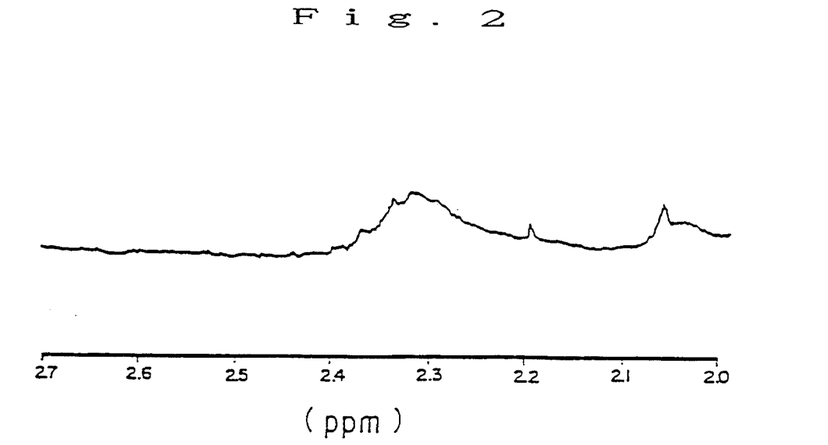
FIG. 2 shows an enlarged view of the 270 MHz NMR spectrum of FIG. 1 at $\delta = 2.0$ to 2.7 ppm.

Synthesis of an ethylene-vinyl alcohol copolymer having N-butylamide at one end thereof A reaction vessel equipped with a stirrer was charged with 20 g of an ethylene-vinyl alcohol copolymer having undergone esterification of its molecular end in the same manner as in Synthesis Example 3 and having an ethylene content of 32 mol % and a degree of hydrolysis of 99.5 mol %, 50 g of dimethyl sulfoxide and 30 g of butylamine, and reaction was effected at 80° C. for 3 hours. After completion of the reaction, the vessel was cooled to room temperature and the reaction mixture was reprecipitated from distilled water. The product obtained was washed well with distilled water, dried with hot air at 100° C. for 5 hours and vacuum-dried at 100° C. for 12 hours, to give an ethylene-vinyl alcohol copolymer having N-butylamide at one end thereof and having an intrinsic viscosity as determined in water-containing phenol at 30° C. of 1.07 dl/g, an ethylene content of 32 mol % and a degree of hydrolysis of 99.9 mol %. The obtained copolymer was subjected to 270 MHz NMR spectrometry in a 4/1 mixed deuterated methanol/heavy water at 80° C. FIG. 1 shows the obtained NMR spectrum. FIG. 2 shows an enlarged view of a region of $\delta = 2.0$ to 2.7 ppm. From the results of the NMR spectrometry and from consideration of the reaction mechanism, the product was identified to be an ethylene-vinyl alcohol copolymer having an N-butylamide group at one end thereof.

Example 4

Figure 3:
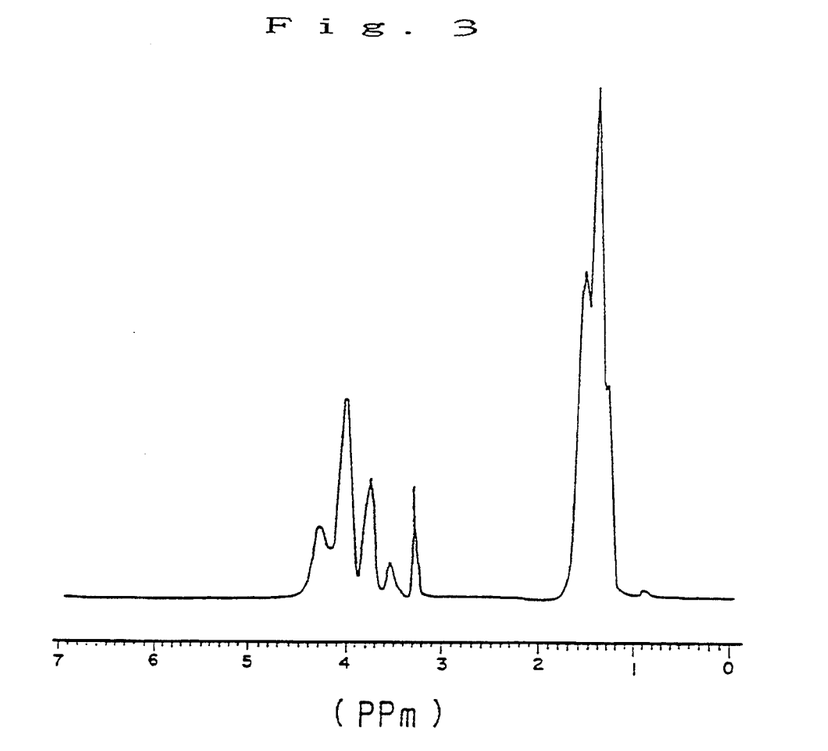
FIG. 3 shows the 270 MHz NMR spectrum of the ethylene-vinyl alcohol copolymer having at one end thereof N- (2-hydroxyethyl) amide obtained in Example 4, measured in 4:1 mixed deuterated methanol/heavy water at 80° C.
Figure 4:
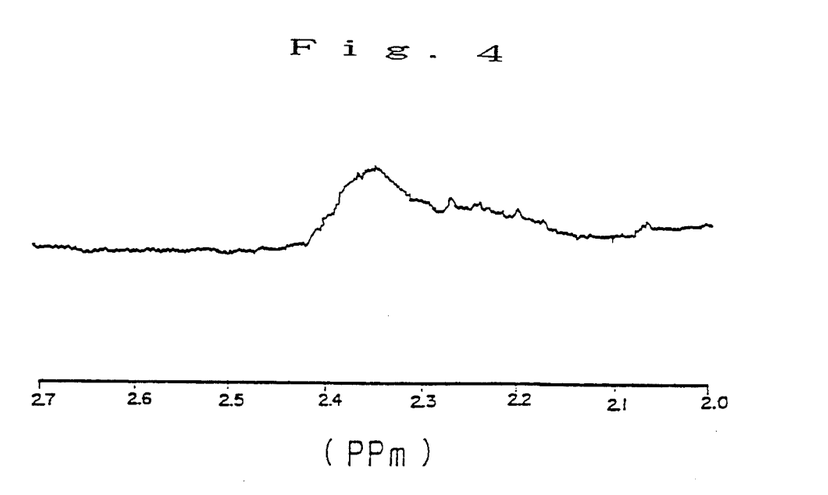
FIG. 4 shows an enlarged view of the 270 MHz NMR spectrum of FIG. 3 at $\delta = 2.0$ to 2.7 ppm.

Synthesis of an ethylene-vinyl alcohol copolymer having N-(2-hydroxyethyl)amide at one end thereof A reaction vessel equipped with a stirrer was charged with 20 g of an ethylene-vinyl alcohol copolymer having undergone esterification of its molecular end in the same manner as in Synthesis Example 3 and having an ethylene content of 32 mol % and a degree of hydrolysis of 99.5 mol %, 50 g of dimethyl sulfoxide and 30 g of ethanolamine, and reaction was effected at 80° C. for 3 hours. After completion of the reaction, the vessel was cooled to room temperature and the reaction mixture was reprecipitated from distilled water. The product obtained was washed well with distilled water, dried with hot air at 100° C. for 5 hours and vacuum-dried at 100° C. for 12 hours, to give an ethylene-vinyl alcohol copolymer having an N-(2-hydroxyethyl)amide at one end thereof and having an intrinsic viscosity as determined in water-containing phenol at 30° C. of 1.07 dl/g, an ethylene content of 32 mol % and a degree of hydrolysis of 99.9 mol %. The obtained copolymer was subjected to 270 MHz NMR spectrometry in a 4/1 mixed deuterated methanol/heavy water at 80° C. FIG. 3 shows the obtained NMR spectrum. FIG. 4 shows an enlarged view of a region of $\delta = 2.0$ to 2.7 ppm. From the results of the NMR spectrometry and from consideration of the reaction mechanism, the product was identified to be an ethylene-vinyl alcohol copolymer having an N-(2-hydroxyethyl)amide group at one end thereof.

Example 5

Synthesis of an ethylene-vinyl alcohol copolymer having hydrazide at one end thereof A reaction vessel equipped with a stirrer was charged with 50 g of the ethylene-vinyl alcohol copolymer with its end having undergone esterification in the same manner as in Synthesis Example 3 and having an ethylene content of 62 mol % and a degree of hydrolysis of 99.7 mol %, 100 g of methanol, 20 g (0.4 mole) of hydrated hydrazine and 5 ml of a 2N sodium hydroxide solution in methanol, and reaction was effected at 65° C. for 3 hours. After completion of the reaction, the vessel was cooled to room temperature and the reaction mixture was reprecipitated from distilled water. The copolymer gel obtained was washed well with distilled water, dried with hot air at 100° C. for 5 hours and vacuum-dried at 100° C. for 12 hours, to give an ethylene-vinyl alcohol copolymer having a hydrazide group at one end thereof and having an intrinsic viscosity as determined in water-containing phenol at 30° C. of 0.64 dl/g, an ethylene content of 62 mol % and a degree of hydrolysis of 99.9 mol %. The amino group at one end of the copolymer was quantitatively determined in the same manner as in Example 1, and found to be $5.6 \times 10^{-5}$ equivalent/g. From this results and from consideration of the reaction mechanism, the product was identified to be an ethylene-vinyl alcohol copolymer having a hydrazide group at one end thereof.

Example 6

Melt blending was conducted through Plastograph at 80 rpm and at a temperature of 200° C. for 30 minutes. The materials blended above were 40 g of an ethylene-vinyl alcohol copolymer synthesized in the same manner as in Example 1 and having a hydrazide group at one end thereof and having an intrinsic viscosity as determined in water-containing phenol at 30° C. of 1.08 dl/g, an ethylene content of 32 mol % and a degree of hydrolysis of 99.9 mol % and an amide group content of $3.2 \times 10^{-5}$ equivalent/g and 10 g of an ethylene-glycidyl methacrylate copolymer having a glycidyl methacrylate content of about 10%. Then it was found that the ethylene-glycidyl methacrylate copolymer dispersed uniformly in the ethylene-vinyl alcohol copolymer having a hydrazide group at one end thereof. The average particle diameter of the dispersoid of the ethylene-glycidyl methacrylate copolymer was 0.154 μm. The obtained resin gave films having excellent transparency and excellent other film properties, thus proving its high utility.

Comparative Example 1

Example 6 was repeated except that an ethylene-vinyl alcohol copolymer having an intrinsic viscosity as determined in water-containing phenol at 30° C. of 1.08 dl/g, an ethylene content of 32 mol % and a degree of hydrolysis of 99.9 molt was used instead of the terminal hydrazide-containing ethylene-vinyl alcohol copolymer, to obtain a resin. In the resin, although the ethylene-glycidyl methacrylate copolymer dispersed in the ethylene-vinyl alcohol copolymer, the dispersoid had an average particle diameter of 0.35 μm. The resin gave films having poorer transparency and poorer other film properties than those from the resin obtained in Example 6.

Example 7

Synthesis of an ethylene-vinyl alcohol copolymer having hydrazide group at one end thereof A reaction vessel equipped with a stirrer was charged with 76.6 g of an ethylene-vinyl acetate copolymer having an ethylene content of 43 mol % and 150 g of methanol and the mixture was heated at 50° C. with stirring to dissolve. To the solution 15 g of hydrated hydrazine was added and reaction was effected at 50° C. for 1 hour. After completion of the reaction, the vessel was cooled to room temperature and the reaction mixture was reprecipitated from distilled water. The copolymer obtained was washed well with distilled water and vacuum-dried at 50° C. for 12 hours, to give an ethylene-vinyl alcohol copolymer having a hydrazide group at one end thereof and having an intrinsic viscosity as determined in water-containing phenol at 30° C. of 1.20 dl/g, an ethylene content of 43 mol % and a degree of hydrolysis of 3.0 mol %. The amino group at one end of the copolymer was quantitatively determined in the same manner as in Example 1, and found to be $3.2 \times 10^{-6}$ equivalent/g. From this results and from consideration of the reaction mechanism, the product was identified to be an ethylene-vinyl alcohol copolymer having a hydrazide group at one end thereof.

Example 8

Synthesis of an ethylene-vinyl alcohol copolymer having hydrazide group at one end thereof A reaction vessel equipped with a stirrer was charged with 10 g of the ethylene-vinyl alcohol copolymer obtained in Example 7 and having terminal amino group and 10 g of methanol, and the mixture was heated at 50° C. with stirring to dissolve. To the solution 5 g of a 0.88% sodium hydroxide solution in methanol was added and reaction was effected at 50° C. for 30 minutes. After completion of the reaction, 0.2 g of acetic acid was added and the resulting mixture was added to distilled water to precipitate polymer. The polymer was washed well with distilled water and vacuum-dried at 50° C. for 12 hours, to give an ethylene-vinyl alcohol copolymer having a hydrazide group at one end thereof and having an intrinsic viscosity as determined in water-containing phenol at 30° C. of 1.10 dl/g, an ethylene content of 43 mol % and a degree of hydrolysis of 52 mol %. The amino group at one end of the copolymer was quantitatively determined in the same manner as in Example 1, and found to be $3.7 \times 10^{-6}$ equivalent/g.

Example 9

Synthesis of an ethylene-vinyl alcohol copolymer having hydrazide group at one end thereof An autoclave equipped with a stirrer was charged with 100 g of an ethylene-vinyl alcohol copolymer synthesized in the same manner as in Synthesis Example 2 and having an ethylene content of 32 mol % and a degree of hydrolysis of 9.5 mol %, 400 g of methanol and 0.5 g of sulfuric acid and reaction was effected at 60° C. for 2 hours. Then 25 g of hydrated hydrazine was added and reaction was effected at 120° C. for 4 hours. After completion of the reaction, the autoclave was cooled to room temperature and the polymer gel that formed was washed well with distilled water and pulverized. The powder obtained was washed well with 0.3 g/l aqueous acetic acid solution, dried with hot air at 60° C. for 10 hours and vacuum-dried at 100° C. for 12 hours, to give an ethylene-vinyl alcohol copolymer having a hydrazide group at one end thereof and having an intrinsic viscosity as determined in water-containing phenol at 30° C. of 1.07 dl/g, an MI of 1.6 g/10 min, an ethylene content of 32 mol % and a degree of hydrolysis of 99.9 mol %. The amino group at one end of the copolymer was quantitatively determined in the same manner as in Example 1, and found to be $3.2 \times 10^{-5}$ equivalent/g.

Example 10

A blend was prepared from 80 g of the ethylene-vinyl alcohol copolymer having hydrazide group at one end thereof obtained in Example 9 and 20 g of an ethylene-glycidyl methacrylate copolymer having an glycidyl methacrylate content of 15% (i.e. functional group equivalent of 950) and an MI of 3 g/10 min. The blend was pelletized under the following conditions.

Extruder used: Segment-type 25 mm-$\phi$ laboratory 2-screw extruder
  Type of screw: C (strong kneading type)
  Screw rotation: 230 rpm
  Output : 0.6 kg/h The pellets obtained were formed into 2 films having thicknesses of 25 μm and 100 μm, respectively through a laboratory single-screw extruder at 220° C.

Comparative Example 2

Example 10 was repeated except that as a thermoplastic vinyl alcohol polymer a conventional ethylene-vinyl alcohol copolymer having an ethylene content of 32 mol %, a degree of hydrolysis of 99.8 mol % and an MI of 1.6 g/10 min was used.

Comparative Example 3

Example 10 was repeated except that there were used as a thermoplastic vinyl alcohol polymer a conventional ethylene-vinyl alcohol copolymer having an ethylene content of 32 mol %, a degree of hydrolysis of 99.8 mol % and an MI of 1.6 g/10 min and, as a thermoplastic polymer, a low density polyethylene having an MI of 3 g/10 min.

Table 1 shows principal properties of the films obtained in Example 10 and Comparative Examples 2 and 3. As seen from the table, the films of Example 10 are far superior in tensile strength and elongation, transparency and gas barrier properties, to those of Comparative Examples 2 and 3.

TABLE 1

| Item | Test method | Unit | Example 10 | Comp. Ex. 2 | Comp. Ex. 3 |
|---|---|---|---|---|---|
| Haze | JIS K7105*1 | % | 8.8 | 15 | 51 |
| Tensile strength | ASTM D638*2 | Kg/mm² | 5.7 | 2.9 | 3.2 |
| Tensile strength | ASTM D638*3 | Kg/mm² | 4.9 | 2.3 | 2.0 |

TABLE 1-continued

| Item | Test method | Unit | Example 10 | Comp. Ex. 2 | Comp. Ex. 3 |
|---|---|---|---|---|---|
| Tensile elongation | ASTM D638*2 | % | 305 | 300 | 270 |
| Tensile elongation | ASTM D638*3 | % | 340 | 170 | 3 |
| Gas barrier property | *4 | cc · 20 μm/m² · day | 5.6 | 5.9 | — |

Notes:
*1: With 100 μm thick films
*2: With 25 μm thick films in the machine direction
*3: With 25 μm thick films in the transverse direction
*4: A 25 μm thick, unheat-treated film specimen is conditioned at 20° C., 85% RH and then measured for oxygen transmission rate with OX-TRAN 10-50A made by Modern Control Co.

Example 11

There were melt kneaded under the following conditions 40 g of the ethylene-vinyl alcohol copolymer having hydrazide group at one end thereof obtained in Example 9 and 10 g of a methyl methacrylate-glycidyl methacrylate copolymer having an glycidyl methacrylate content of 10% (i.e. functional group equivalent of 1420 and an MI of 2 g/10 min.
  Machine used: Plastograph
  Shape of rotor: Roll type
  Rotation : 80 rpm
  Kneading temp.: 200° C.
  Kneading time: 10 min The resin composition obtained was heat pressed at 220° C. to form a film. The film was forced to break in liquid nitrogen. The plane of rupture was subjected to extraction treatment with xylene at 140° C. and then observed with a scanning electron microscope. The film had excellent transparency and, from the microscopic observation, the average particle diameter of the dispersoid of the methyl methacrylate-glycidyl methacrylate copolymer was 0.2 82 m.

Comparative Example 4

Example 11 was repeated except that as a thermoplastic vinyl alcohol polymer a conventional ethylene-vinyl alcohol copolymer having an ethylene content of 32 mol %, a degree of hydrolysis of 99.8 molt and an MI of 1.6 g/10 min was used. The average particle diameter of the dispersoid of the methyl methacrylate-glycidyl methacrylate copolymer was 0.5 μm and the transparency of the film was worse than that of Example 11.

Comparative Example 5

Example 11 was repeated except that the materials used were as a thermoplastic vinyl alcohol polymer a conventional ethylene-vinyl alcohol copolymer having an ethylene content of 32 mol %, a degree of hydrolysis of 99.8 mol % and an MI of 1.6 g/10 min and, as a thermoplastic polymer, a polymethyl methacrylate having an MI of 2 g/10 min. The average particle diameter of the dispersoid of the polymethyl methacrylate was 3 μm, which was bad. The transparency of the film was far inferior to that of the film of Example 11.

Example 12

There were melt kneaded under the following conditions 10 g of the ethylene-vinyl alcohol copolymer having hydrazide group at one end thereof and obtained in Example 1, 30 g of a conventional ethylene-vinyl alcohol copolymer having an ethylene content of 43 mol % and an MI of 5 /g10 min and 10 g of a methyl methacrylate-glycidyl methacrylate copolymer having an glycidyl methacrylate content of 10% (i.e. functional group equivalent of 1420) and an MI of 30 g/10 min.

Machine used: Plastograph
Shape of rotor: Roll type
Rotation : 80 rpm
Kneading temp.: 200° C.
Kneading time: 10 min The resin composition obtained was heat pressed at 220° C. to form a film. The film was broken in liquid nitrogen. The plane of rupture was subjected to extraction treatment with xylene at 140° C. and then observed with a scanning electron microscope. The film had good transparency and, from the microscopic observation, the average particle diameter of the dispersoid of the methyl methacrylate-glycidyl methacrylate copolymer was 0.3 μm.

Comparative Example 6

The procedure of Example 12 was followed with 10 g of the ethylene-vinyl alcohol copolymer obtained in Synthesis Example 2, 30 g of a conventional ethylene-vinyl alcohol copolymer having an ethylene content of 43 mol % and an MI of 5 g/10 min and 10 g of a methyl methacrylate-glycidyl methacrylate copolymer having an glycidyl methacrylate content of 10% (i.e. functional group equivalent of 1420) and an MI of 30 g/10 min, to prepare a film. The average particle diameter of the dispersoid of the methyl methacrylate-glycidyl methacrylate copolymer was 0.8 μm and the transparency of the film was worse than that of Example 12.

Example 13

There were melt kneaded under the following conditions 40 g of the ethylene-vinyl alcohol copolymer having a hydrazide group at one end thereof and obtained in Example 9 and 10 g of an oxazoline-modified polystyrene having an oxazoline content as converted to a functional group equivalent of 2200 and an MI of 5.0 g/10 min.

Machine used: Plastograph
Shape of rotor: Roll type
Rotation : 80 rpm
Kneading temp.: 200° C.
Kneading time: 30 min The resin composition obtained was heat pressed at 220° C. to form a film. The film was broken in liquid nitrogen. The plane of rupture was subjected to extraction treatment with xylene at 140° C. and then observed with a scanning electron microscope. From the microscopic observation, the average particle diameter of the dispersoid of the oxazoline-modified polystyrene was 0.4 μm.

Comparative Example 7

Example 13 was repeated except that as a thermoplastic vinyl alcohol polymer a conventional ethylene-vinyl alcohol copolymer having an ethylene content of 32 mol %, a degree of hydrolysis of 99.8 mol % and an MI of 1.6 g/10 min was used. The average particle diameter of the dispersoid of the oxazoline-modified polystyrene was 1 μm.

Example 14

The procedure of Example 12 was followed with 10 g of the ethylene-vinyl alcohol copolymer having a 2aminoethylamide group at one end thereof and obtained in Example 2, 30 g of a conventional ethylene-vinyl alcohol copolymer having an ethylene content of 32 mol %, degree of hydrolysis of 99.8 mol % and an MI of 1.6 g/10 min and 10 g of a [maleic anhydride-modified styrene]-[hydrated polyisoprene]-[styrene] block copolymer having a functional group equivalent of 35,000, a styrene content of 35%, a hydration ratio of 98.5% and an MI of 2 g/10 min, to prepare a film. The average particle diameter of the dispersoid of the [maleic anhydride-modified styrene]-[hydrated polyisoprene]-[styrene] block copolymer was 0.2 μm.

Comparative Example 8

Example 14 was repeated except that the materials used were, as a thermoplastic vinyl alcohol polymer, 40 g of a conventional ethylene-vinyl alcohol copolymer having an ethylene content of 32 mol %, a degree of hydrolysis of 99.8 mol % and an MI of 1.6 g/10 min and, as a thermoplastic polymer, 10 g of a [maleic anhydride-modified styrene]-[hydrated polyisoprene]-[styrene] block copolymer having a functional group equivalent of 35,000, a styrene content of 35% , a hydration ratio of 98.5% and an MI of 2 g/10 min, to prepare a film. The average particle diameter of the dispersoid of the [maleic anhydride-modified styrene]-[hydrated polyisoprene]-[styrene] block copolymer was. 0.8 μm.

Obviously, numerous modifications and variations of the present invention are possible in light of the above teachings. It is therefore to be understood that within the scope of the appended claims, the invention may be practiced otherwise than as specifically described herein.

What is claimed is:

1. A vinyl alcohol copolymer having a terminal amino group comprising 1–90 mol % vinyl alcohol units 0–89 mol % vinyl ester units and 10–90 mol % vinyl monomers selected from the group consisting of allyl acetate, allyl chloride, vinyl trimethoxysilane, isopropanyl acetate, N-methylpyrrolidone, olefins, acrylamides, methacrylamides, vinyl ethers, nitriles, vinyl halides, and vinylidene halides, said copolymer having at least one terminal amino group.

2. A vinyl alcohol copolymer according to claim 1 wherein said vinyl monomers are olefins selected from the group consisting of ethylene, propylene, 1-butene and isobutene.

3. A vinyl alcohol copolymer according to claim 1 , wherein said vinyl monomers are acrylamides selected from the group consisting of acrylamide, N-methyl acrylamide, N-ethyl acrylamide, N,N-dimethyl acrylamide, acrylamidepropansulfonic acid or salts thereof, and acrylamidepropyldimethylamine or salts thereof.

4. A vinyl alcohol copolymer according to claim 1, wherein said vinyl monomers are methacrylamides selected from the group consisting of methacrylamide, N-methyl methacrylamide, N-ethyl methacrylamide, and methacrylamidepropyldimethylamine or salts thereof.

5. A vinyl alcohol copolymer according to claim 1 wherein said vinyl monomers are vinyl ethers selected from the group consisting of methyl vinyl ether, ethyl vinyl ether, N-propyl vinyl ether, iso-propyl vinyl ether, t-butyl vinyl ether, dodecyl vinyl ether and stearyl vinyl ether.

6. A vinyl alcohol copolymer according to claim 1 wherein said vinyl monomers are nitriles selected from the group consisting of acrylonitrile and methacrylonitrile.

7. A vinyl alcohol copolymer according to claim 1, wherein said vinyl monomers are vinyl halides selected from the group consisting of vinyl chloride and vinyl fluoride.

8. A vinyl alcohol copolymer according to claim 1, wherein said vinyl monomers are vinylidene halides selected from the group consisting of vinylidene chloride and vinylidiene fluoride.

9. A vinyl alcohol copolymer according to claim 1, wherein said vinyl ester units are selected from the group consisting of vinyl formate, vinyl acetate, vinyl propionate, vinyl pivalate, vinyl butrate, vinyl valerate, vinyl caprate, vinyl benzoate and vinyl trifluoroacetate.

10. A vinyl alcohol copolymer according to claim 1 wherein said vinyl ester units is vinyl acetate and said vinyl monomer is ethylene.

* * * * *